(12) United States Patent
Arai et al.

(10) Patent No.: US 11,970,015 B2
(45) Date of Patent: Apr. 30, 2024

(54) PRINTER, PRINTER CONTROL METHOD OF PRINTER AND NON-TRANSITORY COMPUTER-READABLE MEDIUM

(71) Applicant: SATO HOLDINGS KABUSHIKI KAISHA, Tokyo (JP)

(72) Inventors: Hidekazu Arai, Saitama (JP); Yuji Saito, Saitama (JP)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 125 days.

(21) Appl. No.: 17/425,812

(22) PCT Filed: Feb. 3, 2020

(86) PCT No.: PCT/JP2020/003997
§ 371 (c)(1),
(2) Date: Jul. 26, 2021

(87) PCT Pub. No.: WO2020/202770
PCT Pub. Date: Oct. 8, 2020

(65) Prior Publication Data
US 2022/0161571 A1 May 26, 2022

(30) Foreign Application Priority Data
Mar. 29, 2019 (JP) .................. 2019-068596

(51) Int. Cl.
*B41J 3/407* (2006.01)
*B41J 3/50* (2006.01)
*G06K 7/015* (2006.01)

(52) U.S. Cl.
CPC ............... *B41J 3/4075* (2013.01); *B41J 3/50* (2013.01); *G06K 7/015* (2013.01)

(58) Field of Classification Search
None
See application file for complete search history.

(56) References Cited

U.S. PATENT DOCUMENTS

| 4,718,081 A | 1/1988 | Brenig |
| 2008/0030335 A1 | 2/2008 | Nishida et al. |
| 2014/0035733 A1* | 2/2014 | Yamamoto ............... G06K 1/20 340/10.51 |

FOREIGN PATENT DOCUMENTS

| JP | 2003-29669 A | 10/2003 |
| JP | 2003-296669 A | 10/2003 |

(Continued)

OTHER PUBLICATIONS

Machine translation of JP 2007-164426 (Year: 2007).*

*Primary Examiner* — Matthew G Marini
(74) *Attorney, Agent, or Firm* — Foley & Lardner LLP

(57) ABSTRACT

A printer configured to print on a printing medium having an RFID, comprising a communication unit configured to communicate with the RFID, and a search unit configured to move the communication unit to a position with respect to the RFID to search for a position communicable with the RFID, wherein the search unit determines communication success/failure between the RFID and the communication unit at a plurality of positions with respect to the RFID, and on the basis of a region including a plurality of positions determined as the communication being successful, identifying a communication position between the RFID and the communication unit.

14 Claims, 18 Drawing Sheets

(56) References Cited

FOREIGN PATENT DOCUMENTS

| | | | |
|---|---|---|---|
| JP | 2006-260036 A | | 9/2006 |
| JP | 2007-164426 A | | 6/2007 |
| JP | 2007164426 A | * | 6/2007 |
| JP | 2007-213298 A | | 8/2007 |
| JP | 2010-201791 A | | 9/2010 |
| WO | WO 2006/070462 A | | 7/2006 |

* cited by examiner

| X-axis position | 30 mm |
|---|---|
| Y-axis position | 0 mm |
| Inlet length | 60 mm |
| Radio wave output strength | ▲ Increase |
| | 20 dBm |
| | ▼ Decrease |
| Cancel | Start |

Fig.8

PRINTER, PRINTER CONTROL METHOD OF PRINTER AND NON-TRANSITORY COMPUTER-READABLE MEDIUM

TECHNICAL FIELD

The present invention relates to a printer, a printer control method of printer and program.

BACKGROUND ART

RFID (Radio Frequency Identification) technology transmits and receives, via contactless communication, information on an IC chip on which identification information is written, and is applied in various fields. JP2003-29669A discloses a printer that writes in information to an RFID element without contact, as well as printing on label paper embedded with an RFID element.

SUMMARY OF INVENTION

In the conventional art, the antenna position is identified on the basis of an initial position and a final position at which communication with the RFID was successful, and thus there were cases where an optimum antenna position could not be efficiently identified.

In view of such technical problem, an object of the present invention is to more efficiently identify an optimum antenna position.

According to one aspect of the present invention, a printer is provided, which the printer prints on a printing medium having an RFID, the printer including: a communication unit configured to communicate with the RFID; and a search unit configured to move the communication unit to a position with respect to the RFID to search for a position that can communicate with the RFID, wherein the search unit determines whether communication between the RFID and the communication unit were successful or not at a plurality of positions with respect to the RFID, and identifies a communication position between the RFID and the communication unit on the basis of a region including a plurality of positions determined as the communication being successful.

According to the printer pertaining to the present invention, it is possible to identify an optimum antenna position more efficiently.

BRIEF DESCRIPTION OF DRAWINGS

FIG. 8 is an explanatory diagram of a starting screen.

DESCRIPTION OF EMBODIMENTS

Figure 1:
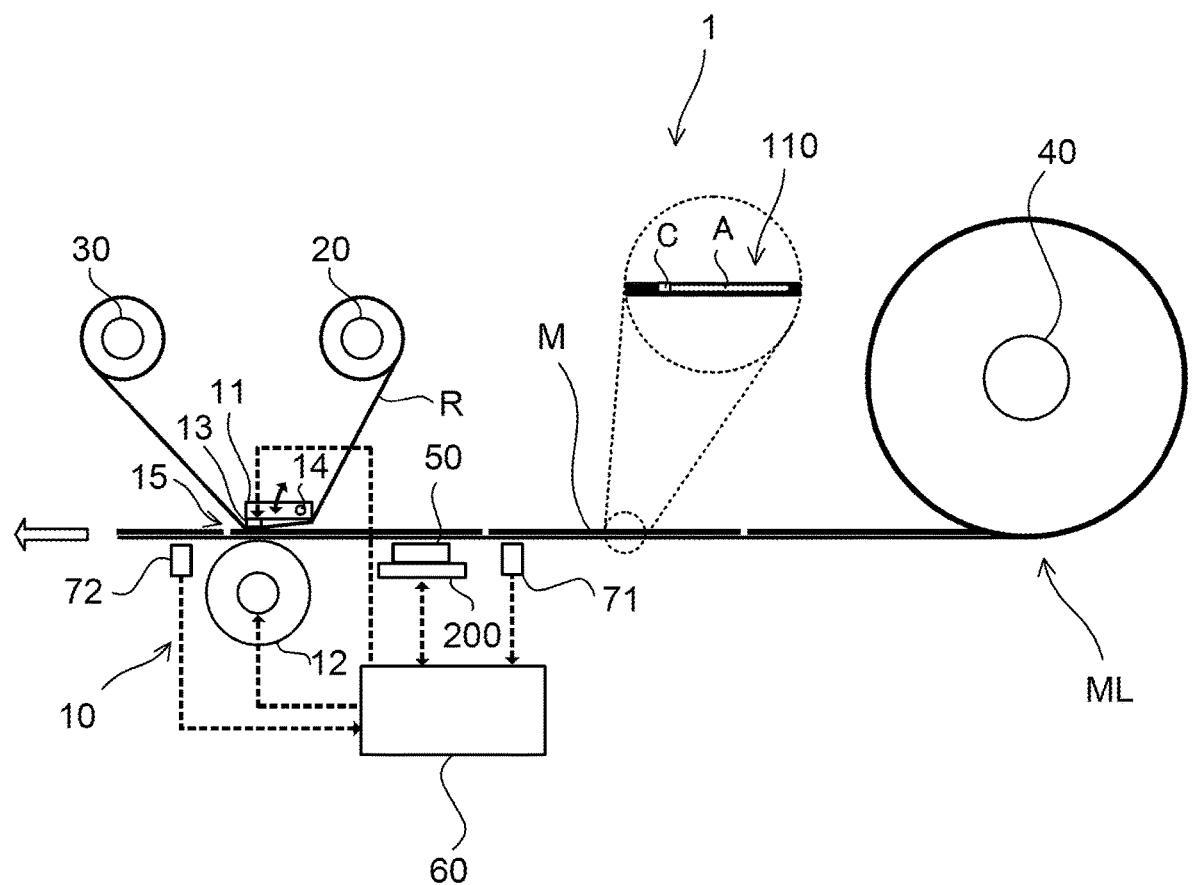
FIG. 1 is a schematic configuration diagram of a printer according to an embodiment of the present invention.

The following describes a printer 1 according to embodiments of the present invention in detail with reference to the attached drawings. FIG. 1 is a schematic configuration diagram of a printer 1 according to an embodiment of the present invention.

The printer 1 is of a thermal transfer type that prints by heating an ink ribbon R and transferring the ink of the ink ribbon R onto a print medium M. The print medium M is configured, for example, as a continuous body ML on which a plurality of labels are continuously attached temporarily at predefined intervals on a band-form backing paper and which is wound as a roll shape.

The print medium M is configured as an RFID (Radio Frequency Identification) medium embedded with an RFID inlet 110 having an IC chip C of the RFID specification and an antenna A. The printer 1 may also print on a printing medium having no IC chip C or antenna A.

The printer 1 prints variable information such as prices, barcodes, other product information, and management information related to objects or services as necessary on a printing region of the print medium M, and also writes in information corresponding to the variable information to the RFID inlet 110 as electronic data.

The present embodiment describes, as one example of the print medium M, an example of a label that has an adhesive on its back surface and that can be adhered on a subject by that adhesive, however it is not limited to this; the print medium M may be one that is to be fixed on the subject using a fixing component, such as a tag or a wrist band.

The printer 1, as illustrated in FIG. 1, includes, for example, a printing mechanism 10, a ribbon supply shaft 20, a ribbon roll up shaft 30, a medium supply shaft 40, a communication unit 50, a movable mechanism 200, an upstream side position detection sensor 71, a downstream side position detection sensor 72, and a controller 60 as a control unit.

The printing mechanism 10 includes a head unit 11 and a platen roller 12, and prints onto the print medium M and feeds the continuous body ML and the ink ribbon R.

The head unit 11 holds a thermal head 13 with a heating element in the thermal head 13 exposed from a lower surface. The platen roller 12 is disposed immediately below the thermal head 13 and constitutes a printing unit 15 that performs printing on the print medium M with the thermal head 13.

The head unit 11 is swingably supported in the arrow direction in FIG. 1 by a supporting shaft 14. The head unit 11 can move to a head open position where the thermal head 13 is separated from the platen roller 12, and a head close position where the thermal head 13 abuts on the platen roller 12. In FIG. 1, the head unit 11 is at the head closed position.

The ribbon supply shaft 20 holds the ink ribbon R to be supplied to the printing unit 15 in a roll shape. The ink ribbon R supplied from the ribbon supply shaft 20 to the printing unit 15 is nipped between the thermal head 13 and the platen roller 12.

The medium supply shaft 40 holds the continuous body ML to be fed to the printing unit 15 in a roll shape. The continuous body ML fed from the medium supply shaft 40 to the printing unit 15 is nipped the ink ribbon R between the thermal head 13 and the platen roller 12.

When the heat generating element in the thermal head 13 is energized with the print medium M and the ink ribbon R nipped between the thermal head 13 and the platen roller 12, the ink of the ink ribbon R is transferred onto the print medium M by the heat of the heat generating elements, the printing is performed on the print medium M. A positive rotation of the platen roller 12 by a platen driving motor (not illustrated) feeds the continuous body ML and the ink ribbon R to downstream.

The used ink ribbon R is rolled up to the outer periphery of the ribbon roll up shaft 30 when the ribbon roll up shaft 30 rotates due to engagement of gears with the platen drive motor. When the head unit 11 is in the head-open position, just the ink ribbon R can be fed by rotating the ribbon roll up shaft 30.

The following describes a printer 1 of the ink ribbon transfer type by the thermal head 13, however it is not limited to this. For example, the print medium M may be thermal paper, and the printer may be one using a thermal coloring system that prints onto the print medium M by applying heat from the thermal head 13.

The upstream side position detection sensor 71 includes a transmission type photoelectric sensor and a reflection type photoelectric sensor. The continuous body ML is printed with an eye mark for position detection at a predetermined intervals (pitch) in accordance with the print medium M. The reflection type photoelectric sensor detects a relative position of the print medium M with respect to the printing unit 15 by detecting the eye mark. The transmission type photoelectric sensor detects the relative position of the print medium M with respect to the printing unit 15 by detecting a clearance (gap) between a print medium M and a print medium M in the continuous body ML.

The downstream side position detection sensor 72 includes a transmission type photoelectric sensor or a reflection type photoelectric sensor, and detects the head position of the continuous body ML.

The upstream side position detection sensor 71 and the downstream side position detection sensor 72 are determined in relative positions with the position of the printing unit 15, more specifically, the position at which the thermal head 13 performs printing onto the print medium M and the position at which the platen roller 12 and the thermal head 13 are nipped the continuous body ML. The upstream side position detection sensor 71 and the downstream side position detection sensor 72 can detect the relative position of the print medium M with respect to the printing unit 15 by detecting the position of the print medium M. The eye mark for position detection printed on the continuous body ML at a predetermined intervals (pitches) on the continuous body ML accordance with the print medium M and the gaps between the print medium M serve as a criterion for setting a position to start printing on the print medium M (printing starting position).

The controller 60 receives input of, via an input/output interface, printing command data from an external computer, detection signals from the upstream side position detection sensor 71 and the downstream side position detection sensor 72 and the like. The controller 60 controls energization of the heating element in the thermal head 13, energization of respective drive motors, energization of the communication unit 50, and communication (reading, writing) with the IC chip C embedded in the RFID inlet 110 of the print medium M, and the like.

When printing, the controller 60 executes the printing process in a state where the position of the print medium M to be printed is aligned with the printing start position, as illustrated in FIG. 1. The printing start position is set on the basis of the position of the eye mark on the continuous body ML.

The communication unit 50 has an antenna that transmits a signal to the IC chip C of the RFID inlet 110 and receives a response to the signal. The printer 1 includes a movable mechanism 200 that causes an antenna to move, and a relative position of the antenna with respect to the RFID inlet 110 is configured movable.

Figure 2:
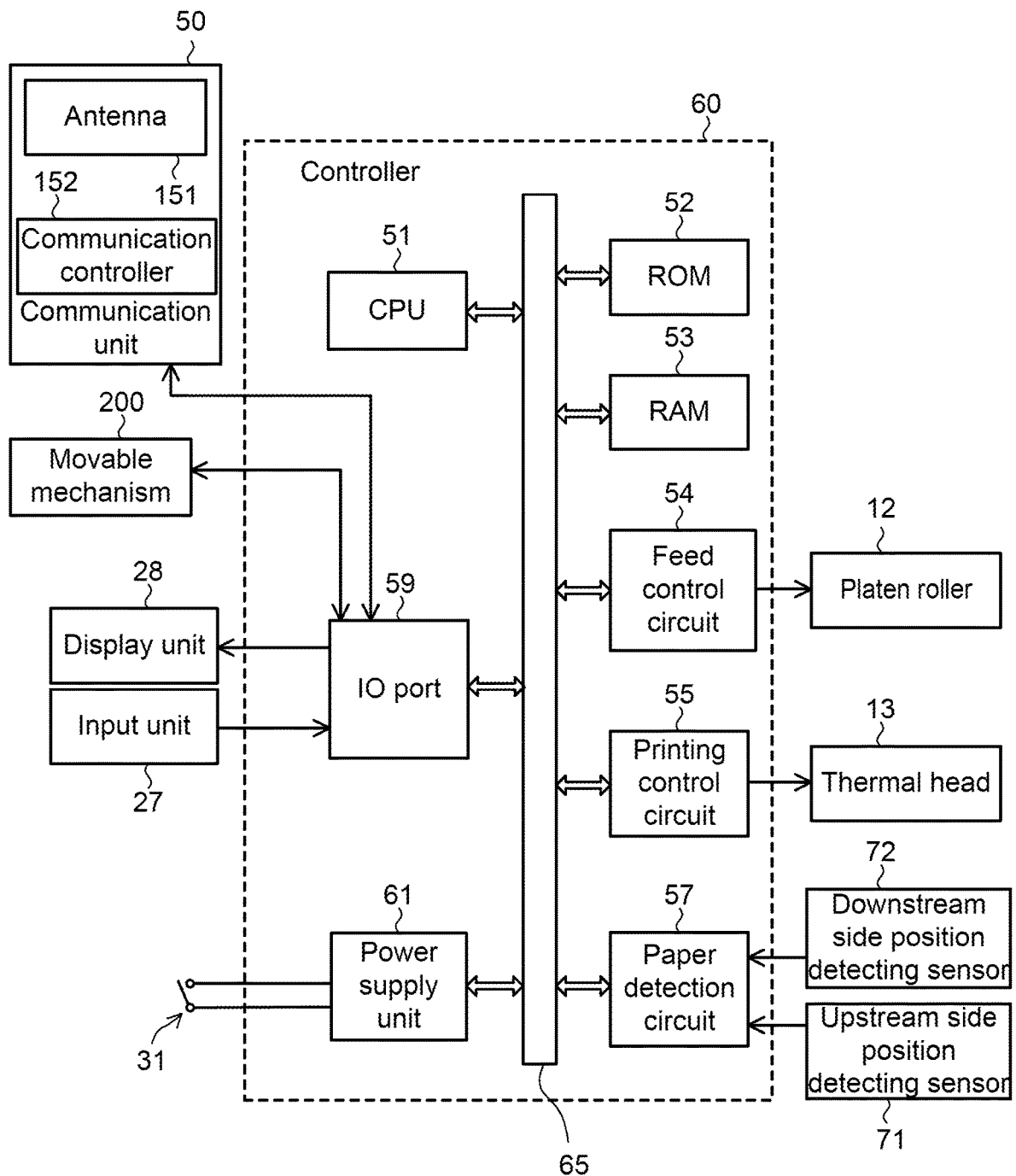
FIG. 2 is a control block diagram of a printer according to an embodiment of the present invention.

FIG. 2 is a configuration block diagram of the controller 60 of the present embodiment.

The controller 60 is, for example, includes a CPU (central processing unit) 51, a ROM (read only memory) 52, a RAM (random access memory) 53, a feed control circuit 54, a printing control circuit 55, a paper detection circuit 57, an IO port 59, and a power supply unit 61. These components are interconnected via a bus 65, and are configured capable of transmitting and receiving various data to each other.

The CPU 51 is a computer that integrally controls the entire controller 60 by executing a program stored on the ROM 52 while also causing each unit to execute the necessary processes and control. The CPU 51 achieves the functions of each unit by executing the program stored on the ROM 52. The various programs executed by the CPU 51 may use for example those stored on a non-transitory recording medium such as a CD-ROM or a non-volatile memory.

The ROM 52 stores a program that is read out and executed by the CPU 51. The RAM 53 stores various information necessary for the processes executed by the CPU 51, printing data necessary for printing, printing format, registration information, and the like.

The feed control circuit 54 controls a drive motor that drives the platen roller 12 in accordance with an command signal from the CPU 51, and controls rotation/termination of the platen roller 12. This controls the feed of the continuous body ML on a paper feed path.

The printing control circuit 55 generates a printing signal corresponding to printing data such as characters, figures and barcodes to be printed supplied from the CPU 51, and supplies the generated printing signal to the thermal head 13 to perform printing onto the print medium M.

The paper detection circuit 57 detects a detection portion such as the eye mark or a gap provided in the continuous body ML on the paper feeding path has, on the basis of information obtained by the upstream side position detection sensor 71 and the downstream side position detection sensor 72, and transmits the information to the CPU 51. The CPU 51 controls the feed of the continuous body ML and the ink ribbon R by the feed control circuit 54 on the basis of the information from the paper detection circuit 57, and controls a timing for printing with the thermal head 13 to perform the printing to an appropriate position on the print medium M.

The IO port 59 is connected to the display unit 28 and the input unit 27, and outputs display data supplied from the CPU 51 to the display unit 28. Moreover, the IO port 59 transmits an operation signal corresponding to an operation by the user to the input unit 27 to the CPU 51. The IO port 59 transmits and receives information with the communication unit 50, and performs communication (reading, writing) with the IC chip C of the RFID inlet 110.

The display unit 28 is configured of a liquid crystal display for example. The input unit 27 is configured of a touch panel equipped in the display unit 28, a button, a DIP-SW, a flash memory interface, a wireless/wired communication interface or the like.

The power supply unit 61 monitors a press operation of the power switch and turns the power of the printer 1 on/off by switching execution and termination of electric power supply to each unit on the basis of operation of the power switch.

The communication unit 50 is configured including, for example, an antenna 151 and a communication controller 152. The antenna 151 communicates with the RFID inlet 110 of the print medium M by outputting a radio wave signal on the basis of control by the communication controller 152 and receiving a response to that signal. The communication controller 152 controls power feed to the antenna 151, on the basis of commands of the controller 60.

The antenna 151 is configured movable in a plane direction of the print medium M (fed direction of the print medium M and direction orthogonal to the fed direction) by the movable mechanism 200. Accordingly, the antenna 151 can be moved to a position corresponding to the position of the RFID inlet 110 of the print medium M that is at a printing starting position.

Figure 3:
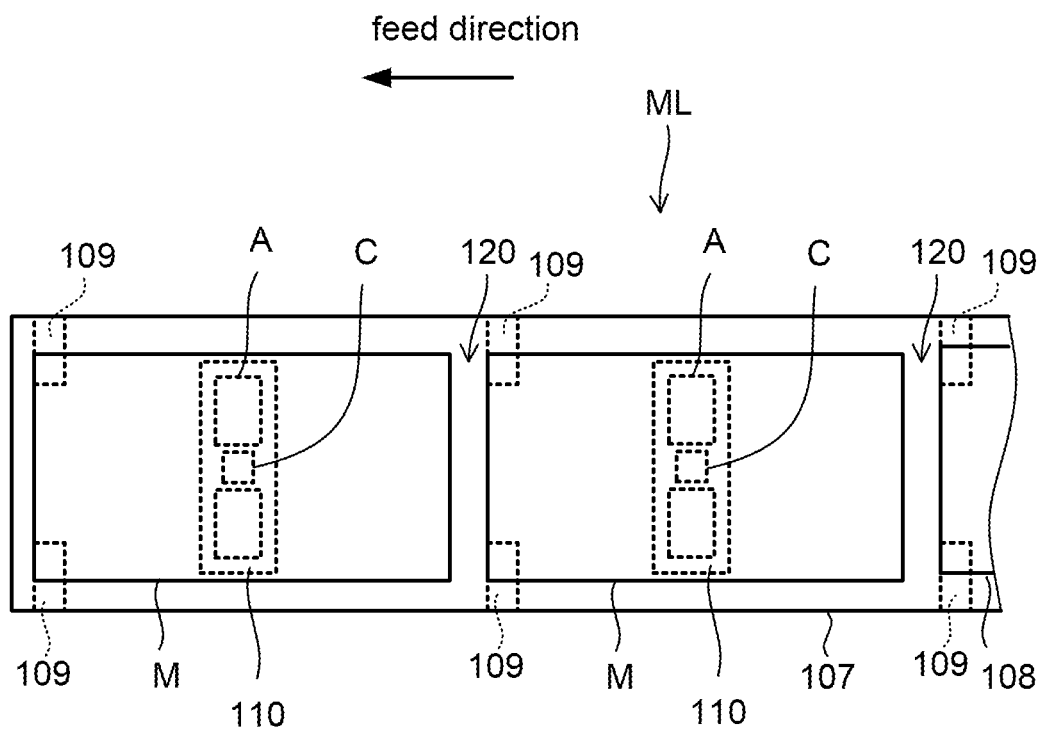
FIG. 3 is a plan view of a printing medium.

Next describes the print medium M. FIG. 3 is a plan view describing the continuous body ML including the print medium M.

The continuous body ML is configured of, for example, a band-form backing paper 107, and plurality pieces of label strips (print medium M) temporarily attached on the backing paper 107.

On a back side of the backing paper 107, eye marks 109 for position detection is printed in advance at positions corresponding to tips on a downstream side in the fed direction of the print medium M. Gaps 120 are provided between adjacent printing media M.

The eye marks 109 are printed in predefined rectangular shapes in a dark color (for example, black color) compared to the backing paper 107. The upstream side position detection sensor 71 can set the printing starting position by detecting the positions of the eye marks 109 by using the color of the eye marks 109 being darker than the backing paper 107.

The gaps 120 have only the thickness of the backing paper 107 compared to locations where the print medium M is present, and thus has high transmissivity. The upstream side position detection sensor 71 and the downstream side position detection sensor 72 can set the printing starting position by detecting the positions of the gaps 120 by using the high transmissivity of the gaps 120.

For example, as illustrated in FIG. 3, the RFID inlet 110 is disposed around the middle of the print medium M in the fed direction.

The RFID inlet 110 is configured, for example, including the IC chip C and the antenna A. The IC chip C of the RFID inlet 110 commences operation by the antenna A receiving a signal outputted from the antenna 151 of the communication unit 50, and outputs a response to this signal via the antenna A.

Figure 4:
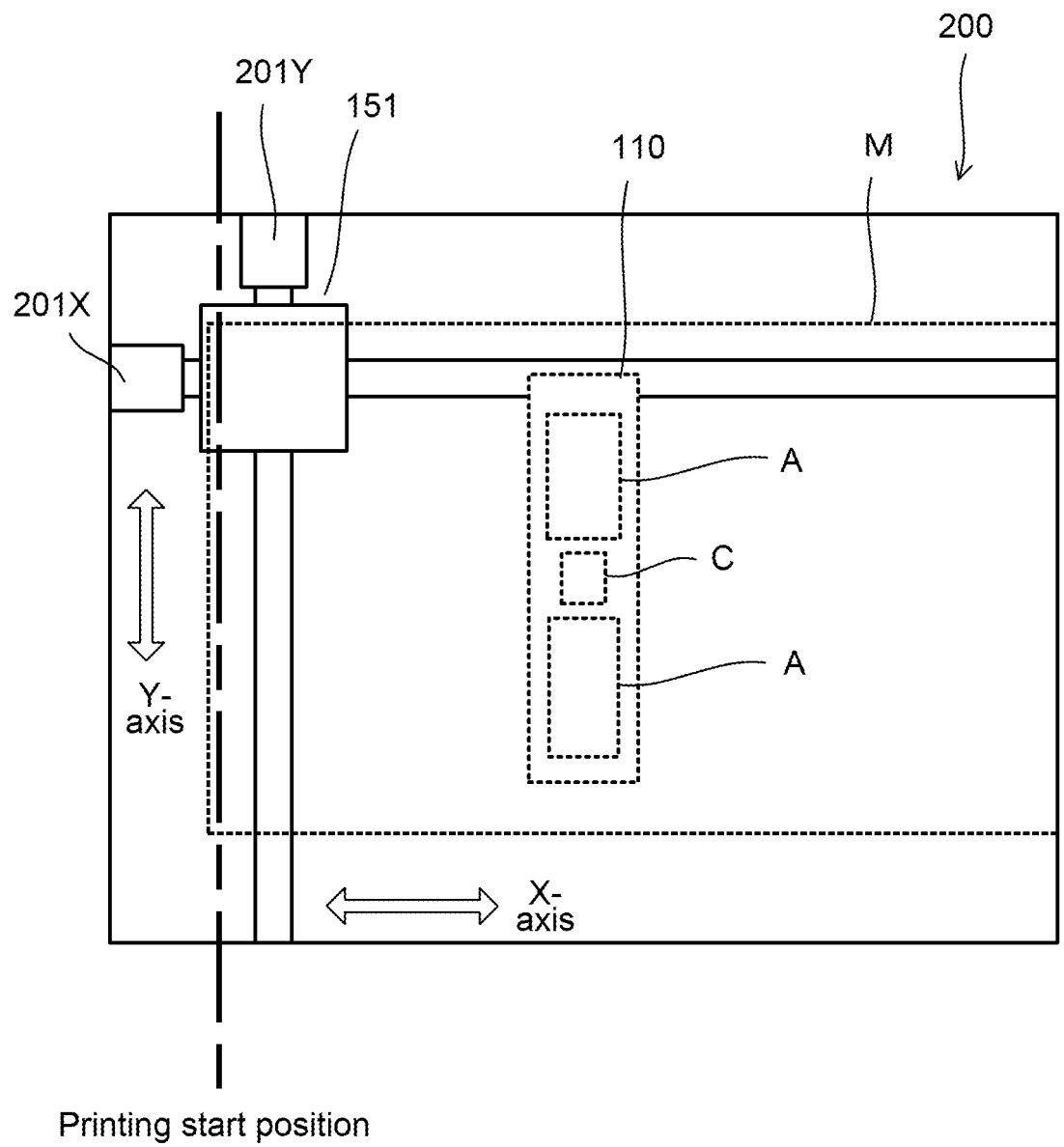
FIG. 4 is a schematic explanatory diagram of a movable mechanism.

FIG. 4 is an explanatory diagram of the antenna 151 of the communication unit 50 and the movable mechanism 200 of the present embodiment.

The movable mechanism 200 includes an X-axis moving unit 201X and a Y-axis moving unit 201Y each configured of a stepping motor and a ball screw or the like provided in the fed direction of the print medium M (hereinafter, also called "X-axis direction") and a direction orthogonal to the fed direction (hereinafter, also called "Y-axis direction").

The movable mechanism 200 can move the antenna 151 to any position on the print medium M by moving, on the basis of an instruction by the controller 60, each of the stepping motors on the X-axis moving unit 201X and the Y-axis moving unit 201Y.

The X-axis moving unit 201X of the movable mechanism 200, as one example, is configured movable by 25 steps at 1 mm pitch in the X-axis direction, and the Y-axis moving unit 201Y is configured movable by 29 steps at 1 mm pitch in the Y-axis direction. The antenna 151, for example, can move to each point in grid-form configured of 25×29 steps within a search range set in advance.

Next describes operations of the printer 1 configured as described above. The printer 1 of the present embodiment reads and writes data recorded on the RFID inlet 110 of the print medium M, as well as printing on the print medium M.

The RFID inlet 110 may differ in position of the RFID inlet 110 on the print medium M due to variation at a manufacturing factory of the continuous body ML or due to a difference in specification or the like of a manufacturing maker. On the contrary, by adjusting the position of the antenna 151 by the movable mechanism 200, it is possible to make the position of the antenna 151 correspond to the position of the RFID inlet 110 when the print medium M is at a printing starting position.

Conventionally, movement to a communicable position was carried out by inputting an instruction value manually to the movable mechanism 200 while viewing the communication condition with the RFID inlet 110. In such a method, there is a need to move the antenna 151 every time the continuous body ML of the print medium M is replaced. Moreover, there were cases where although the communication between the antenna 151 and the RFID inlet 110 was successful, it could not be said that the antenna 151 was set at an optimum communication position.

The present embodiment is configured as follows on the basis of success/failure with the RFID inlet 110 of the print medium M, by searching for a best point of the antenna 151, a "communication position", and moving the antenna 151 to the "communication position" obtained on the basis of the searched result. The best point indicates a communication position of the antenna 151 assumed as optimum with respect to the RFID inlet 110 of the print medium M at the printing starting position.

Figure 5:
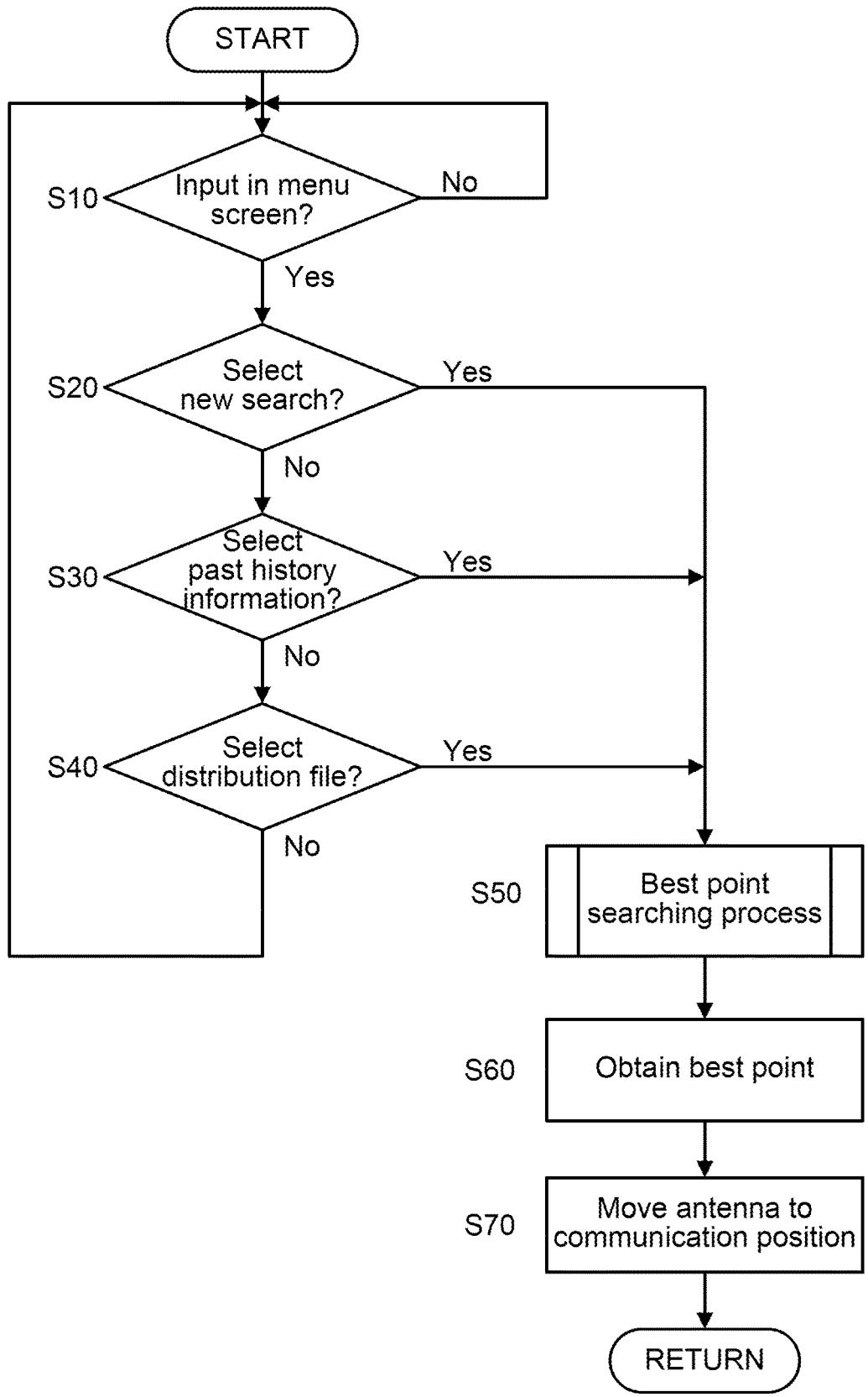
FIG. 5 is a flowchart of a process executed by a controller.

FIG. 5 is a flowchart of a process executed by the controller 60 of the present embodiment. First, the controller 60 displays a menu screen on the display unit 28 (see FIG. 6), and standbys for a user input (step S10). In a case where the controller 60 detects that the user inputted an instruction via the input unit 27, the process moves on to step S20.

Figure 6:
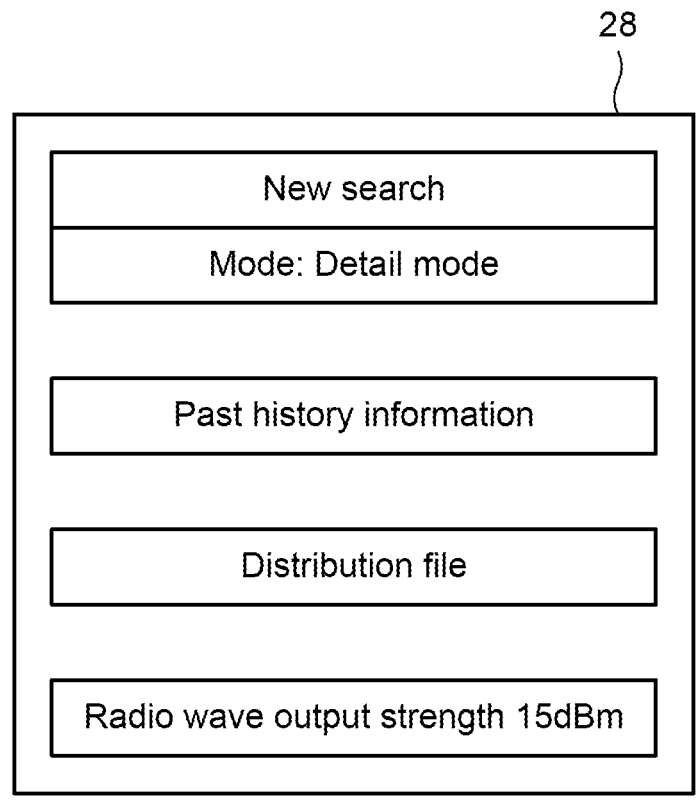
FIG. 6 is an explanatory diagram of a menu screen.

In step S20, the controller 60 determines whether "new search" is selected by the user in the menu screen illustrated in FIG. 6. In a case where the "new search" is selected, the process moves on to step S50. If not that case, the process moves on to step S30.

In step S30, the controller 60 determines whether a "past history information" is selected or not by the user on the menu screen illustrated in FIG. 6. In a case where the "past history information" is selected, the process moves on to step S50. If not that case, the process moves on to step S40.

The "past history information" is information related to a best point determined by the best point searching process in the past (for example, label type, RFID inlet type, coordinates of the best point, or radio wave output strength of the antenna), and may be reused upon reading from a recording region. For example, in a case where the continuous body ML is changed to another type, and thereafter is returned back to the original continuous body ML, it is possible to shorten the process of the best point search by reusing the information regarding the best point in the print medium M of the original continuous body ML.

In step S40, the controller 60 determines whether or not a distribution file (tag model information) is selected by the user in the menu screen illustrated in FIG. 6. In a case where the distribution file is selected, the process moves on to step S50. If not, the process returns back to step S10 and repeats the process.

The distribution file supplies, as tag model information related to the RFID inlet 110 of the print medium M of that continuous body ML, information related to a best point (for example, label type, RFID inlet type, coordinates of the best point (X-axis direction position, Y-axis direction position), radio wave output strength of the antenna (writing strength, reading strength), etc.), at a time of shipping from the factory of the continuous body ML or the like. The user can shorten the process of the best point search by storing the distribution file by a memory card, by wireless communication or the like in the storage region of the printer 1, and by obtaining the information related to the best point from the distribution file.

In a case where the new search is selected in step S20, in a case where the past history information is selected in step S30, and in a case where the distribution file is selected in step S40, the process moves on to step S50 and executes the best point searching process that searches for the best point for the antenna 151 with respect to the RFID inlet 110 of the print medium M. The details of the best point searching process will be described later in FIG. 7.

After the best point searching process of step S50, the controller 60 obtains the best point of the antenna 151 as a "communication position". At this time, a radio wave output strength of the antenna 151 at the best point is also obtained. The controller 60 associates the obtained "communication position" and the "radio wave output strength" and temporarily stores this on the storage region of the RAM 53 (step S60).

Next, the process moves on to step S70, and the controller 60 causes the antenna 151 to move to the "communication position" serving as the best point, by the movable mechanism 200. At this time, the radio wave output strength that the antenna 151 outputs may be set.

By having the antenna 151 move to the best point by this process, it is possible to set the position of the antenna 151 to an optimum position for communicating with the RFID inlet 110.

FIG. 6 illustrates the menu screen displayed on the display unit 28 in step S10. The menu screen, for example, shows each of a new search key to select execution of the "new search", a past history information key to select the "past history information", a distribution file key to select the "distribution file", and information of the antenna 151 currently set. Moreover, the new search key provides a selection key for choosing either a quick mode or a detail mode for the search mode. The search mode is described in FIG. 7.

Figure 7:
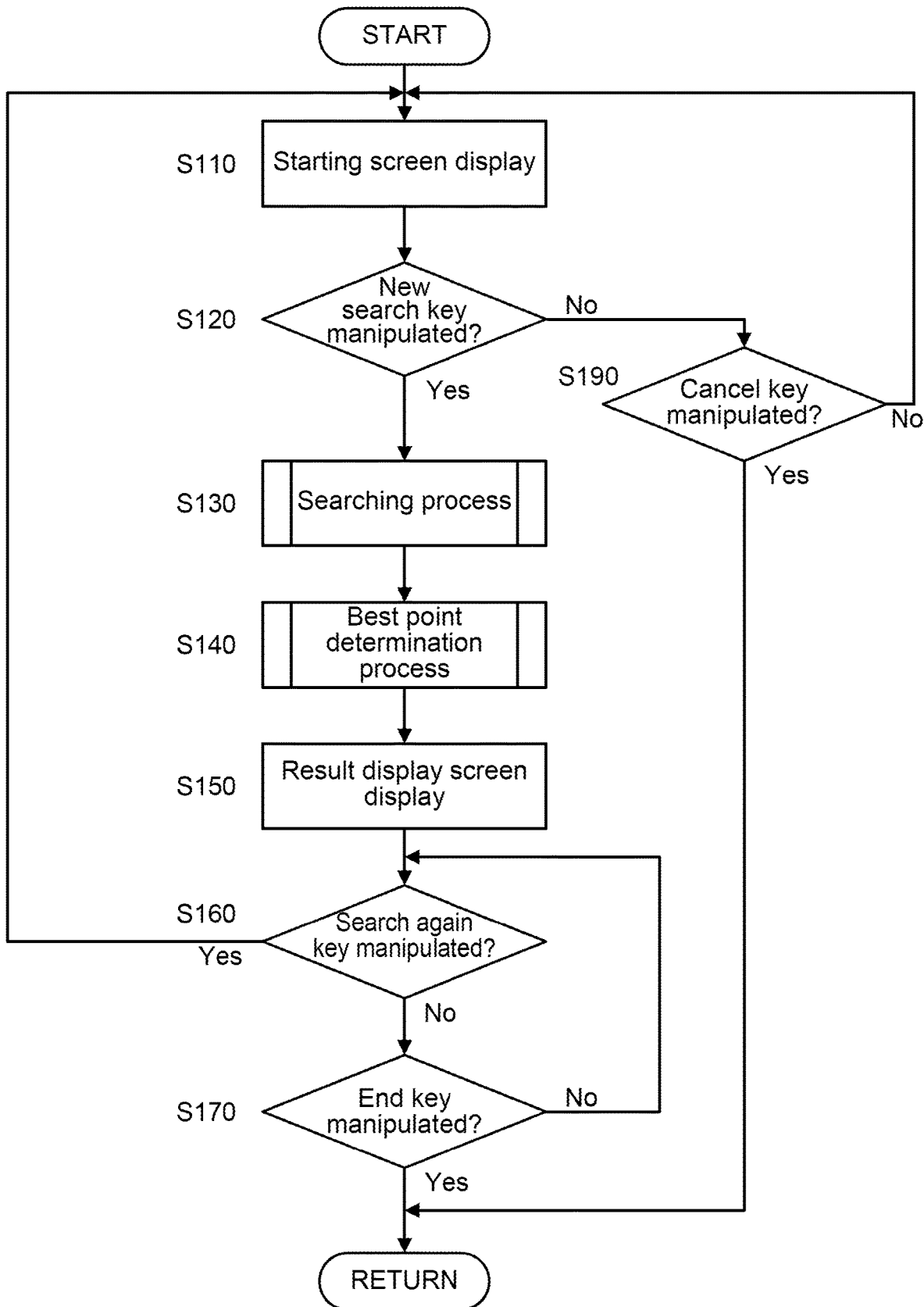
FIG. 7 is a flowchart of a best point searching process.

FIG. 7 is a flow chart of the best point searching process of the present embodiment, and illustrates details of the process of step S50 in FIG. 6.

In the case where the user selects the "new search", the search unit executes the processes on the flowchart. The search unit is a virtual configuration that executes a process for searching the best point by the controller 60 reading in a program stored on the ROM 52 or the like.

First, the search unit causes display on the display unit 28 a starting screen (see FIG. 8) that displays the current position of the antenna 151, the radio wave output strength, and the like (step S110).

The search unit determines whether or not a starting key on the starting screen is manipulated by the user (step S120). In a case where the starting key is not manipulated, the process moves on to step S190 and the controller 60 determines whether or not the cancel key on the starting screen is manipulated by the user.

In a case where the cancel key is manipulated, the process based on the present flowchart ends, and returns to the process of step S10 in FIG. 5. In a case where the cancel key is not manipulated, the process returns back to step S110 and repeats the process.

In step S120, in a case where the input unit 27 detects that the starting key is manipulated, the search unit moves on to step S130 and causes the antenna 151 to move to a pre-defined position by the movable mechanism 200, and executes the searching process that determines success/failure of the communication with the RFID inlet 110. The detail of the searching process is described by the flowchart of FIG. 10.

The printer 1 of the present embodiment includes two modes as the search modes, the "quick mode (first mode)" and the "detail mode (second mode)". The "quick mode" is a mode that reduces a number of searching points (or makes them sparse) to perform the process more rapidly (at a short amount of time). The "detail mode" takes more time than the quick mode, however is a mode that has as much searching points as possible (make dense) to perform a finer search.

The user selects on the menu screen of FIG. 6 described above, as to which mode is used for the searching.

Next, the process moves on to step S140, and the search unit executes the best point determination process that determines the best point with respect to the RFID inlet 110 from the processing results of S130. The details of the best point determination process will be described by the flowchart of FIG. 10.

Figure 9:
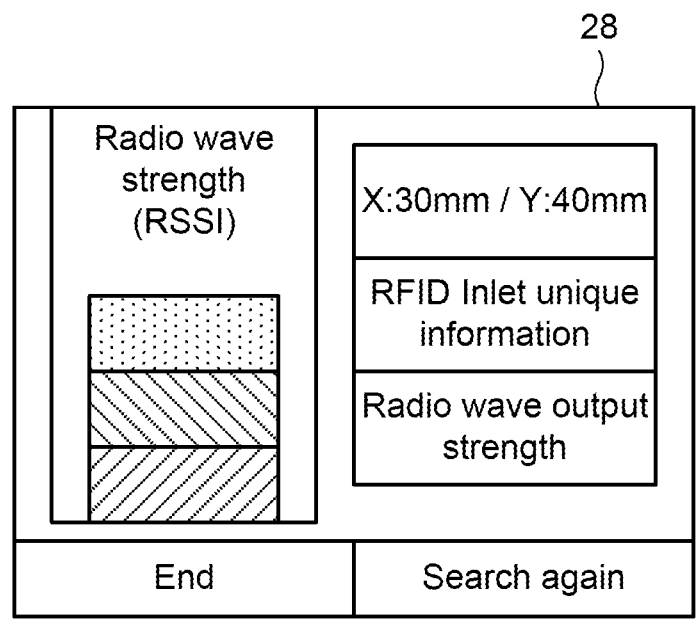
FIG. 9 is an explanatory diagram of a search result display screen.

After the best point determination process, the process moves on to step S150, and the search unit causes display of the results of the best point determination process, that is to say, the position of the best point and the radio wave output strength at the best point and the like on the search result display screen (see FIG. 9).

Next, the search unit determines whether or not a search again key on the search result display screen is manipulated by the user (step S160). In a case where the search again key is not manipulated, the process moves on to step S170 and the controller 60 determines whether or not the user manipulated the end key on the search result display screen. In a case where the end key was not manipulated, the process returns back to step S160.

In a case where the end key is manipulated, the processes in the present flowchart ends and returns to the flowchart of FIG. 5.

FIG. 8 illustrates the starting screen displayed on the display unit 28 in step S110. The starting screen, for example, shows each of a current position of the antenna 151

(X-axis, Y-axis), a size of the RFID inlet 110, and a radio wave output strength of a signal outputted by the antenna 151. The radio wave output strength is set at a default value (recommended value) in advance, however increase, decrease keys are provided to allow for the user to change the radio wave output strength. The starting screen has a cancel key, a start key for example.

FIG. 9 illustrates a search result display screen displayed on the display unit 28 in step S150 of FIG. 7.

The search result display screen, for example, shows each of the position of the best point of the antenna 151, unique information of the RFID inlet 110, radio wave output signal of the antenna 151, and radio wave strength of the RFID inlet 110 (RSSI value). The RSSI value is shown by a column graph for example, and the graph is made to change color depending on the strength of the signal. The search result display screen, for example, has the end key and the search again key.

The user refers to the search result display screen, and searches again if necessary. For example in a case of determining that the RSSI value is higher or lower than a desired value, the search again key can be manipulated to return to the starting screen of FIG. 8, to change the radio wave output strength of the antenna 151 manually.

The search result display screen illustrated in FIG. 9 may display information at the searching point on real time on the display unit 28, every time the success/failure of communication at one searching point is determined in the process described next.

Figure 10:
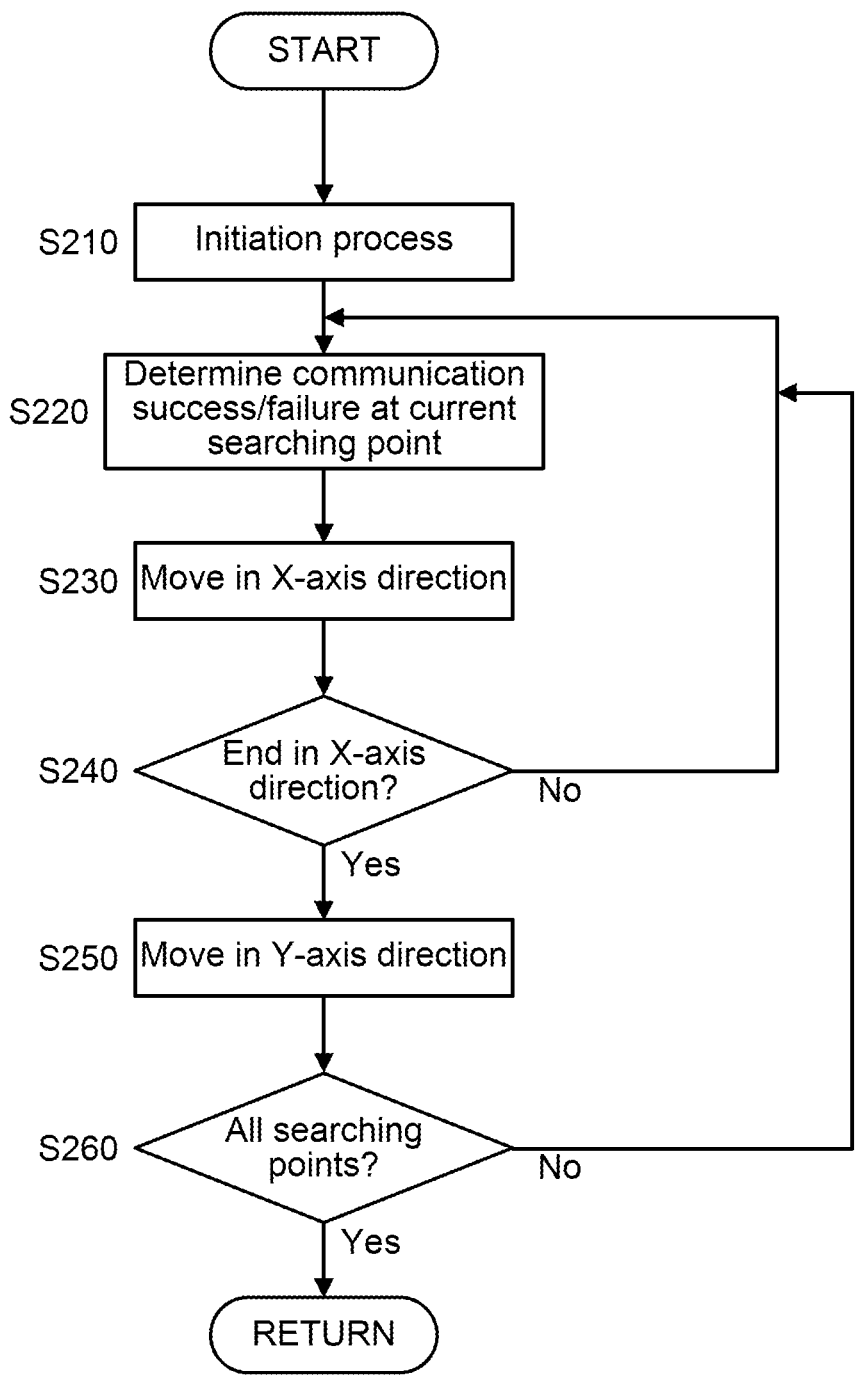
FIG. 10 is a flowchart of a searching process.

FIG. 10 is a flowchart of the searching process of step S130 in FIG. 7.

The search unit is initiated upon transferring information such as the success/failure of the searching point, radio wave output strength and the like stored in the current storage region to a region where past history information is stored (step S210). Here, the search unit causes the antenna 151 to move to a home position by the movable mechanism 200. The home position can be set, for example, at a center position of the Y-axis that is a starting end of the X-axis (for example, searching point D in FIGS. 11 and 12).

Next, the process moves on to step S220, and the search unit attempts communication with the RFID inlet 110 at the current searching point (first time is at the home position), and determines the success/failure of communication. In a case where the communication with the RFID inlet 110 is successful, the radio wave output strength of the antenna 151 at the current searching point, and the radio wave strength (RSSI value) received from the RFID inlet 110 are obtained, and information such as the coordinate positions of the searching point, success/failure of the communication, radio wave output strength, and RSSI value are recorded on the recording region of the RAM 53.

Next, the process moves on to step S230, and the search unit causes the antenna 151 to move in the X-axis direction (for example, arrow E in FIG. 11), to move to the next searching point. In the detail mode, the pitch between searching points are set small, and in the quick mode, the pitch between the searching point can be set larger than the detail mode.

Next, the process moves on to step S240, and the search unit determines whether or not an end is reached of the searching point in the X-axis direction. In a case where the end in reached in the X-axis direction, the process moves on to step S250 and the search unit causes the antenna 151 to move to the searching point in the Y-axis direction (for example, arrow F in FIG. 11). In a case where the search is already completed, the antenna 151 may be moved to a further adjacent searching point (arrow G in FIG. 11).

Next, the process moves on to step S260, and the search unit determines whether or not the determination of communication success/failure is completed at all searching points within the searching range set in advance with respect to the print medium M. Namely, the search unit determines whether the determination of communication success/failure at the searching points set in the Y-axis direction and the X-axis direction in advance is completed or not. In a case where it is determined as not completed, the process returns back to step S220, and determination is made one each as the antenna 151 moves along the searching points in the X-axis direction.

In a case where the determination of communication success/failure is completed at all the searching points, the processes in the present flowchart ends, and returns to the flowchart in FIG. 8.

The search unit executes the searching process of determining success/failure of communication between the RFID inlet 110 and the antenna 151 at a plurality of searching points within the searching range set in advance with respect to the print medium M.

Figure 11:
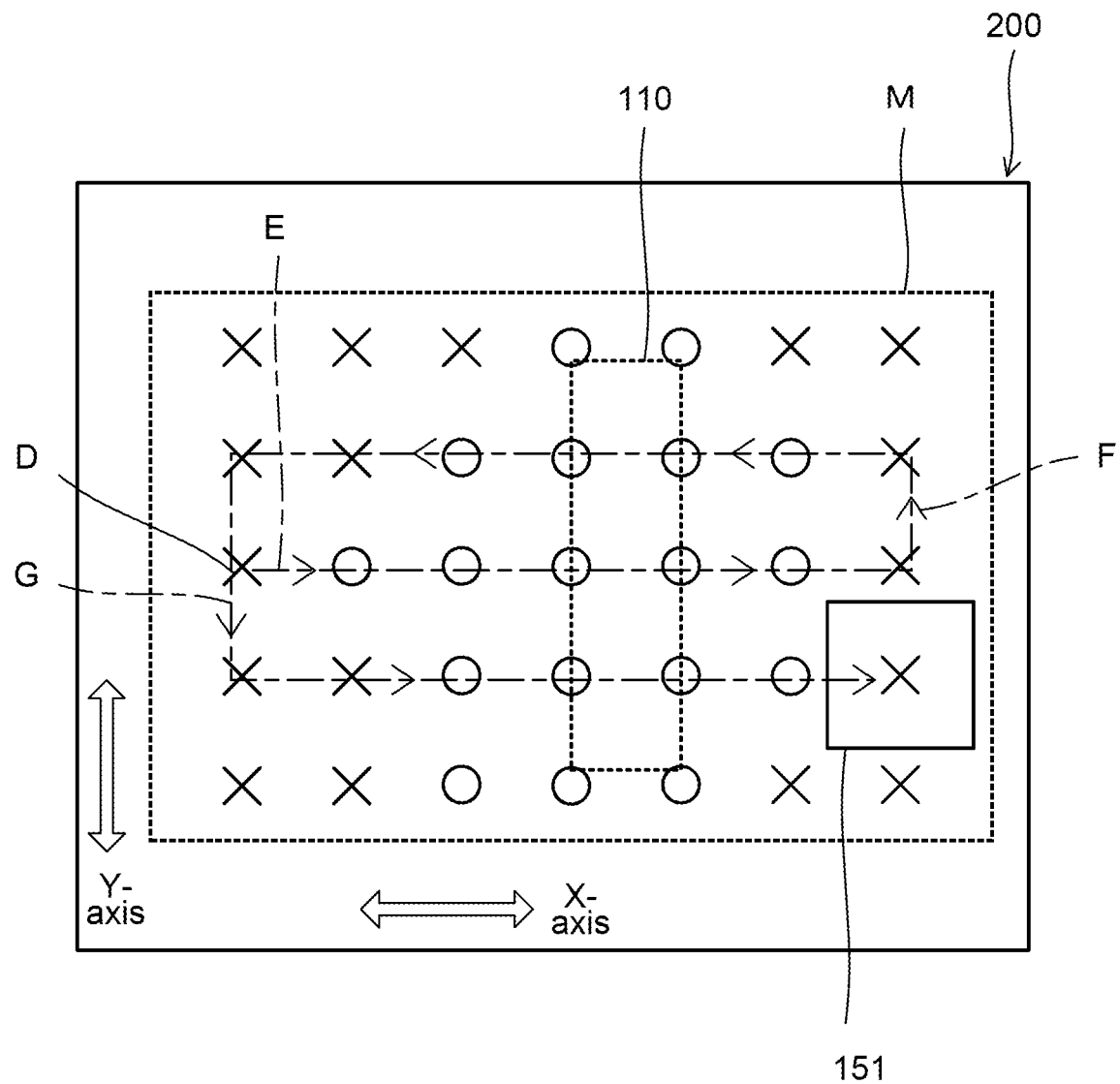
FIG. 11 is an explanatory diagram of a searching point in a quick mode.
Figure 12:
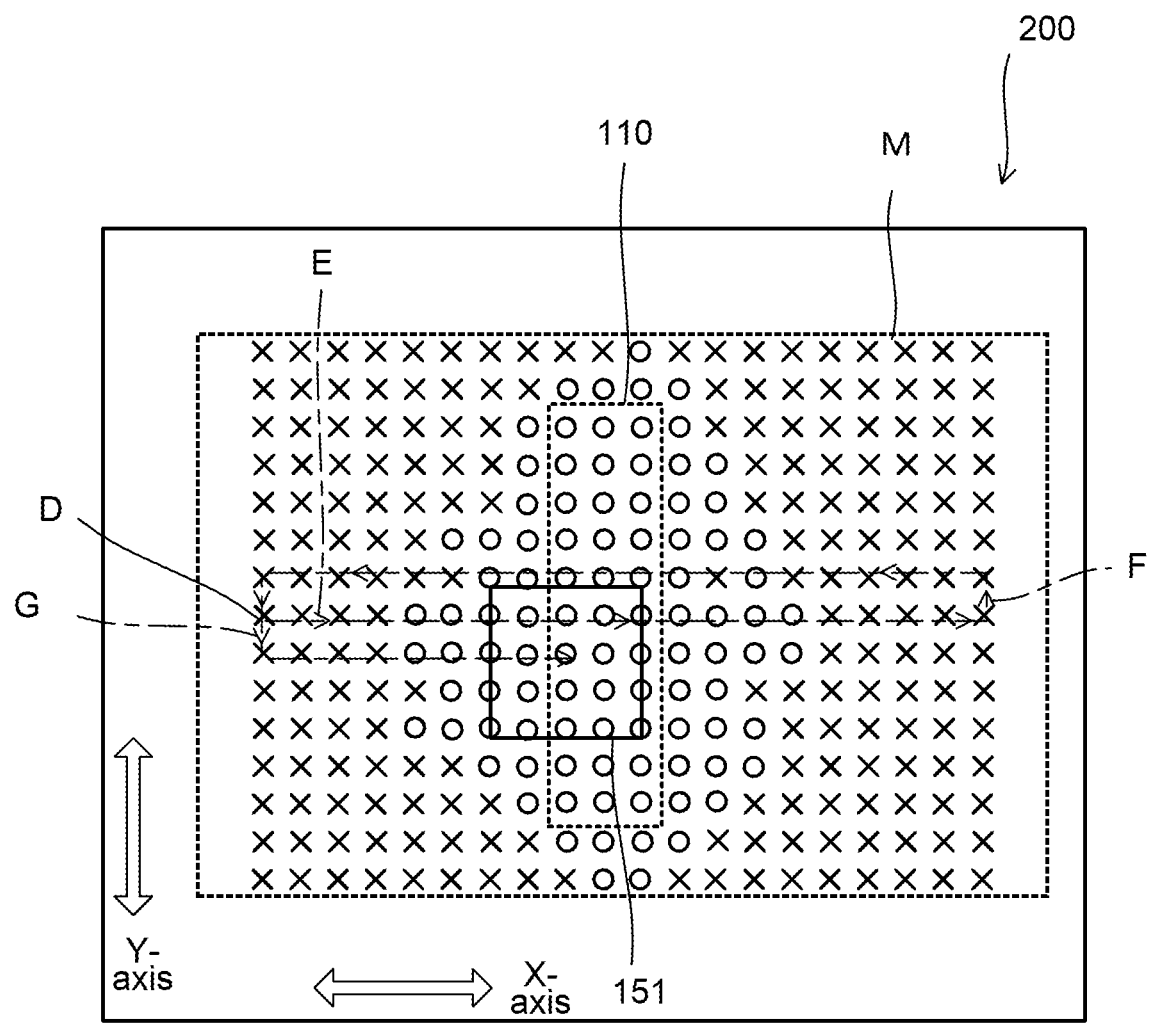
FIG. 12 is an explanatory diagram of a searching point in a detail mode.

FIG. 11 illustrates one example of the communication success/failure at a searching point in the quick mode, and FIG. 12 is an explanatory diagram illustrating one example of the communication success/failure at a searching point in the detail mode. X in the drawing represents a searching point at which the communication failed (failure point), and O represents a searching point at which the communication succeeded (success point).

In the quick mode illustrated in FIG. 11, for example, seven points in the X-axis direction, and five points in the Y-axis direction, totaling to 35 points of searching points may be set in a grid form, within the searching range set in advance with respect to the print medium M. In comparison, in the detail mode illustrated in FIG. 12, for example, 20 points in the X-axis direction, and 15 points in the Y-axis direction, totaling to 300 points of the searching points may be set in a grid form, within the searching range set in advance with respect to the print medium M.

The quick mode can rapidly perform the searching process by disposing a small number of the searching points (sparsely) by broadening the pitch of the searching points. On the other hand, the detail mode can improve accuracy of the search result by disposing many (dense) searching points by narrowing the pitch of the searching points.

In the example of FIGS. 11 and 12, searching is started from a searching point D at the home position, and advances in the X-axis direction from the starting end to a terminal end, as illustrated by arrow E. In a case where the search reaches the terminal end of the X-axis, the search moves to an adjacent searching point in the Y-axis direction as illustrated in arrow F. In a case where the search advances along the X-axis direction from the terminal end to the starting end and returns, and reaches the starting end of the X-axis, the search moves in the Y-axis direction to the next searching point by jumping over the home position, and advances in the X-axis direction from the terminal end to the starting end.

As such, for example the search unit can recognize the success/failure in the communication in each searching point on a two-dimensional plane by causing the antenna 151 to move from the home position in a manner drawing a spiral in the X-axis direction and the Y-axis direction (spiral type).

The searching operation of the searching points is not limited to the example illustrated in FIGS. 11 and 12. FIGS.

13 and 14 are explanatory diagrams illustrating another example of searching operations of the searching points.

Figure 13:
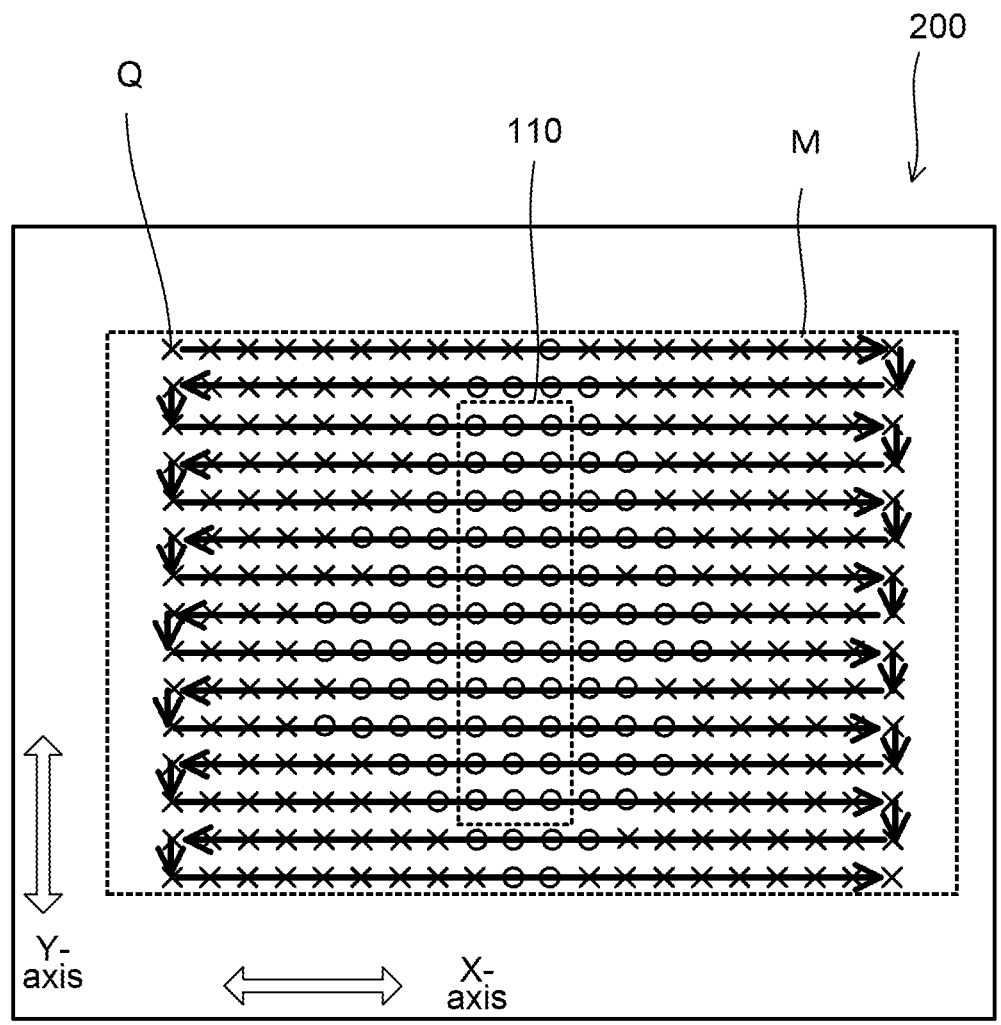
FIG. 13 is an explanatory diagram of another searching point in the detail mode.

For example as illustrated in FIG. 13, the searching may be carried out by setting the home position at an end of the X-axis and Y-axis (searching point Q) and searching by moving from the searching point Q along the X-axis direction, then moving at the end of the X-axis to the position adjacent to the Y-axis and then returning along the X-axis direction (zig-zag type).

Figure 14:
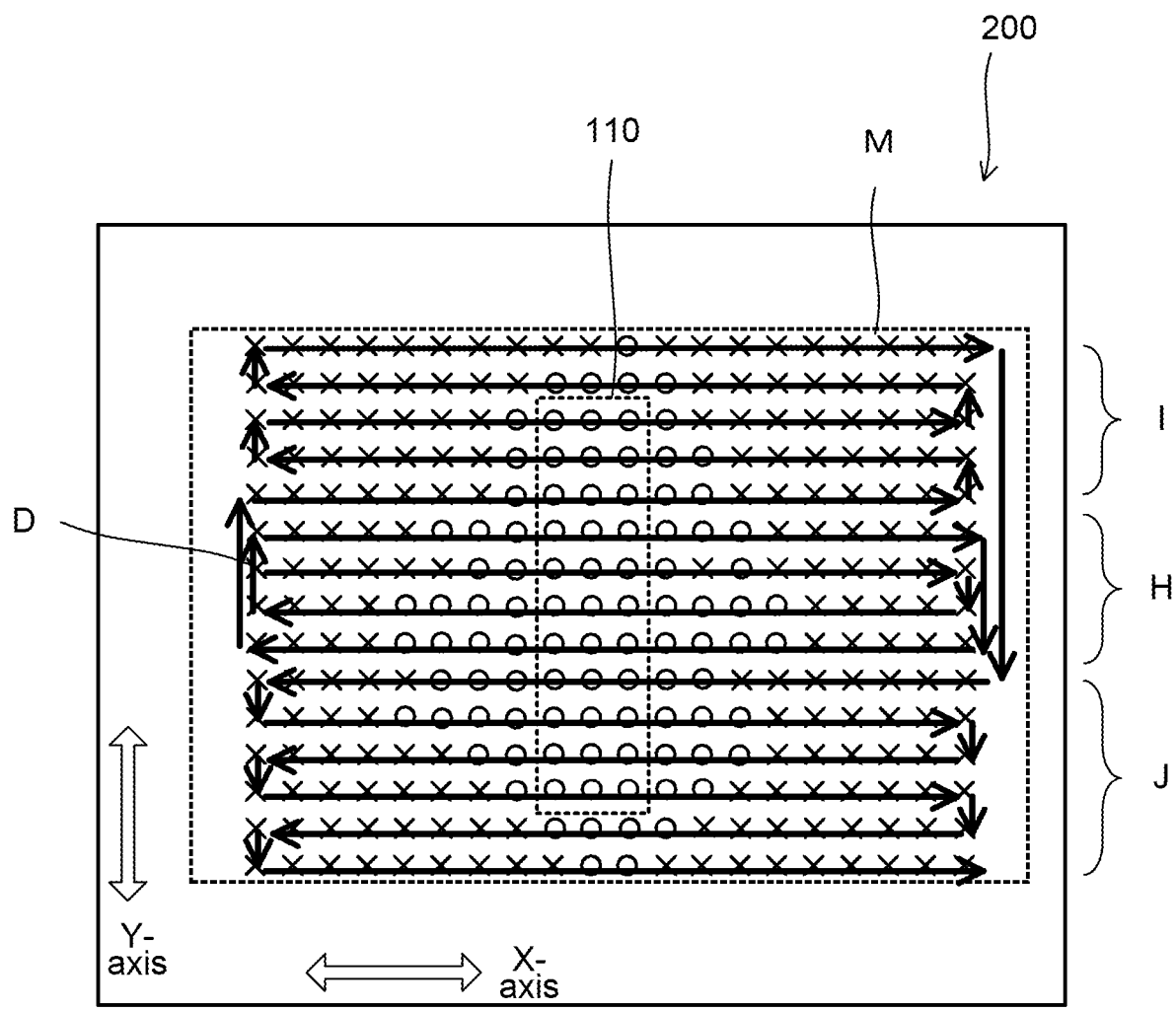
FIG. 14 is an explanatory diagram of another searching point in the detail mode.

Moreover, as illustrated in FIG. 14, the home position is set at a starting end of the X-axis and a middle position on the Y-axis (searching point D), and from this searching point D searching is carried out while moving along the X-axis, then moving at the end of the X-axis to the position adjacent to the Y-axis and again returning back along the X-axis direction, to move as like drawing a spiral as described above (H region). Next, the search moves upper of the Y-axis, searches while moving towards the X-axis direction, then moving at the end of the X-axis to the position adjacent to the Y-axis and returning back along the X-axis again, to search by moving in a zig-zag form (I region). When reaching the end of the Y-axis, the search may move to a region on the other side about the H region (region J), and similarly search while moving in a zig-zag form (complex type). Moreover, the home position may be set at a center portion on the X-axis and Y-axis. As such, the search unit can determine the best point by changing the home position, or combining a plurality of the searching operations described above.

Moreover, in a case where the position of the RFID inlet 110 in the print medium M illustrated in FIG. 3 is biased to a leading side or rear side of the print medium M, the best point may not be found within the searching range where the searching points are set illustrated in FIGS. 11 and 12 described above. In such a case, the best point may be identified by feeding the print medium M in the fed direction, or moving the searching range by backfeeding, to execute the processes of S130 to S140 in FIG. 7.

Figure 15:
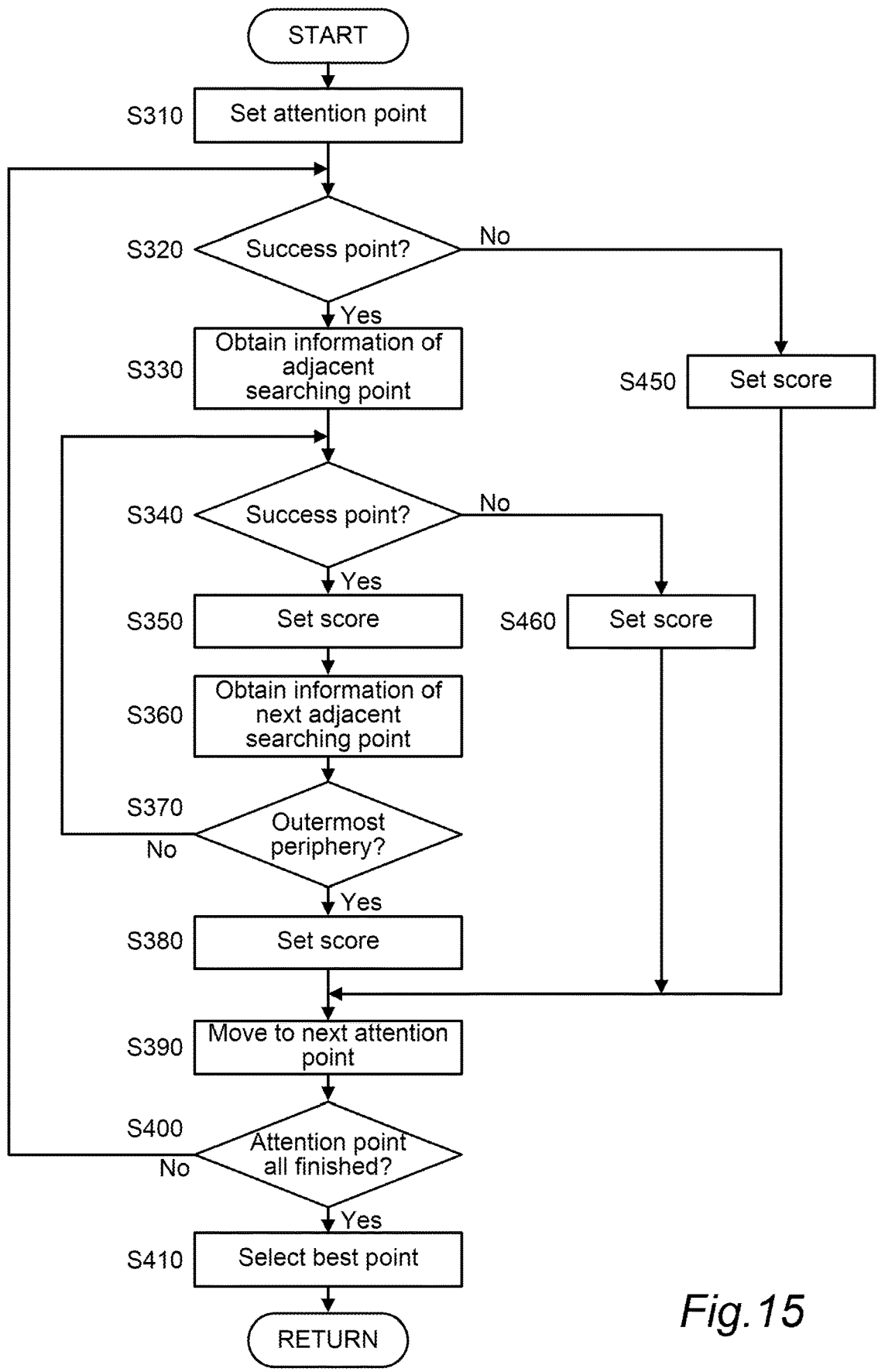
FIG. 15 is a flowchart of a best point determination process.

FIG. 15 is a flowchart of the best point determination process of step S140 in FIG. 7.

The best point determination process of the present embodiment calculates a "score" in each searching point on the basis of communication success/failure information at the searching points. The score determines the searching point with the highest score as the optimum communication position (best point) of the antenna 151 with respect to the RFID inlet 110.

The score is calculated by the following process with reference to communication success/failure information of surrounding searching points regarding the searching points, for example.

Figure 16:
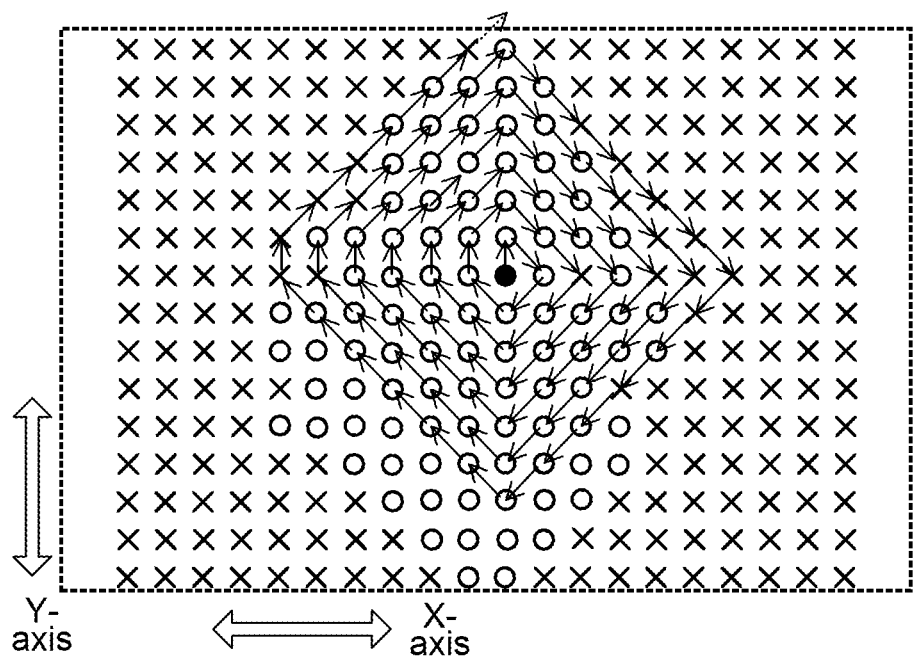
FIG. 16 is an explanatory diagram illustrating obtaining of success/failure information at an attention point.

In step S310, the search unit obtains the communication success/failure information of the searching point stored in the current storage region, and aligns this on a two-dimensional plane (see FIG. 16). The search unit, for example, sets any one searching point as an "attention point".

Next, the process moves on to step S320, and the search unit determines whether the attention point is a success point or not. In a case of a failure point, the process moves on to step S450, and "0" is added to the score for the attention point and the score is updated. Thereafter, the process moves on to step S390.

The search unit, in a case of determining in step S320 as a success point, moves on to step S330 and obtains success/failure information of a searching point adjacent to the attention point. As one example, success/failure information of a searching point diagonally upper of the attention point illustrated in FIG. 16 (illustrated as a black dot) is obtained.

The search unit moves on to step S340, and determines whether the adjacent point obtained in step S330 is a success point or not. In a case of the failure point, the search unit moves on to step S460, and updates the score.

The search unit, in a case of determining in step S340 as a success point, moves on to step S350, adds a positive value (for example, "+1") to the score of the attention point and updates the score.

Next, the search unit moves on to step S360 and selects another searching point that is further adjacent, with respect to the adjacent point selected in step S330. As one example, communication success/failure information of a searching point on the right of the attention point illustrated in FIG. 16 (illustrated as a black dot) is obtained. Namely, as illustrated in FIG. 16, the success/failure information is obtained while moving across the searching points in a spiral form about the attention point.

Next, the search unit determines whether another searching point is a point on an "outermost periphery" (step S370). The "outermost periphery" means for an outermost searching point among the set of searching points, and in FIG. 16 is indicated as an upper end or lower end in the X-axis direction, or a right end or a left end in the Y-axis direction.

In a case where another searching point is at the outermost periphery, the process moves on to step S380. In a case of not being at the outermost periphery, the search unit returns back to step S340 and repeats the determination of whether or not another searching point is a success point. In a case of a failure point, the search unit moves on to step S460 and updates the score. Namely, the search unit records the number of success points until a failure point appears. In a case of a success point, the search unit moves on to step S350 and a positive value (+1) is added on the score of the attention point.

In a case where another searching point is at the outermost periphery, the process moves on to step S380, and the score of the attention point is subtracted (adding a negative value to the score (for example, "−0.2") and updates the score. The score is subtracted since in a case where the attention point is at a location close to the end of the print medium M there are few success points in the surroundings, and thus is controlled to increase the scores of a point closer to the center.

Next, the process moves on to step S390, and the search unit changes the attention point to another searching point. More specifically, the searching point adjacent in the X-axis direction of the attention point set in step S310 is set as the attention point. In a case where the attention point is an end in the X-axis direction, a searching point adjacent in the Y-axis direction is set as the attention point.

Next, the search unit moves on to step S400, and determines whether the processes described above is executed or not for all points. In a case where the processes for all the points are not completed, the process returns back to step S320 and repeats the process.

In a case where the processes as the attention point are executed for all the searching points, the search unit moves on to step S410 and selects the "best point" having the highest score among the searching points. Here, in a case where there is a plurality of the best points with the same score, for example, a best point close to the home position set in advance is selected. Moreover, the point having a higher RSSI value in the point may be selected as the best point. Moreover, the best point closest to the current position of the antenna 151 may be selected.

As such, a search unit is configured having a virtual configuration calculating the best point of the antenna 151 on the basis of communication success/failure information in a plurality of the searching points.

The present embodiment calculates the score by weighting upon selecting the surrounding searching points in a spiral manner, for each of the searching points set on the two-dimensional plane, in a case of acknowledging the print medium M as a two-dimensional plane. The score of the searching point is of a high value in weighting as the number of success points surrounding the searching point increases. Namely, a searching point with the highest score, that is to say, a searching point having a region including the most success points in the surroundings is made to be the best point.

By determining the best point as such, it is possible to determine the communication position of the antenna 151 optimum in communication with the RFID inlet 110.

As illustrated in FIG. 15, the search unit calculated the score by weighting on the basis of whether it is a success point or not, however the search unit may also be configured to calculate the best point by adding to the score as a weighting a strength of the RSSI value of the success point.

In the present embodiment, the printer 1 to set the best point of the antenna 151 may be carried out by a printer different from the printer 1 that executes each process. For example, the best point of the antenna 151 is determined in advance by using a continuous body ML for setting the best point at a factory or a service center, and is prepared as a distribution file. Thereafter, in the menu screen in FIG. 6, the distribution file may be stored on the RAM 53 of the printer 1 installed at a used location, and in a state where the continuous body ML of the same specification is mounted, the distribution file can be used for searching the position of the antenna 151 or may be set as it is as the best point.

In step S360 of the best point determination process, the form is not necessarily a spiral form, and other searching operations may be performed. For example, the score may be set while moving along the Y-axis to which the attention point belongs one by one in the X-axis direction and when reaching the end of the Y-axis moving to the one adjacent Y-axis, and this may be repeated. Alternatively, movement can be made in a rectangular form in the X-axis, Y-axis directions.

Figure 17:
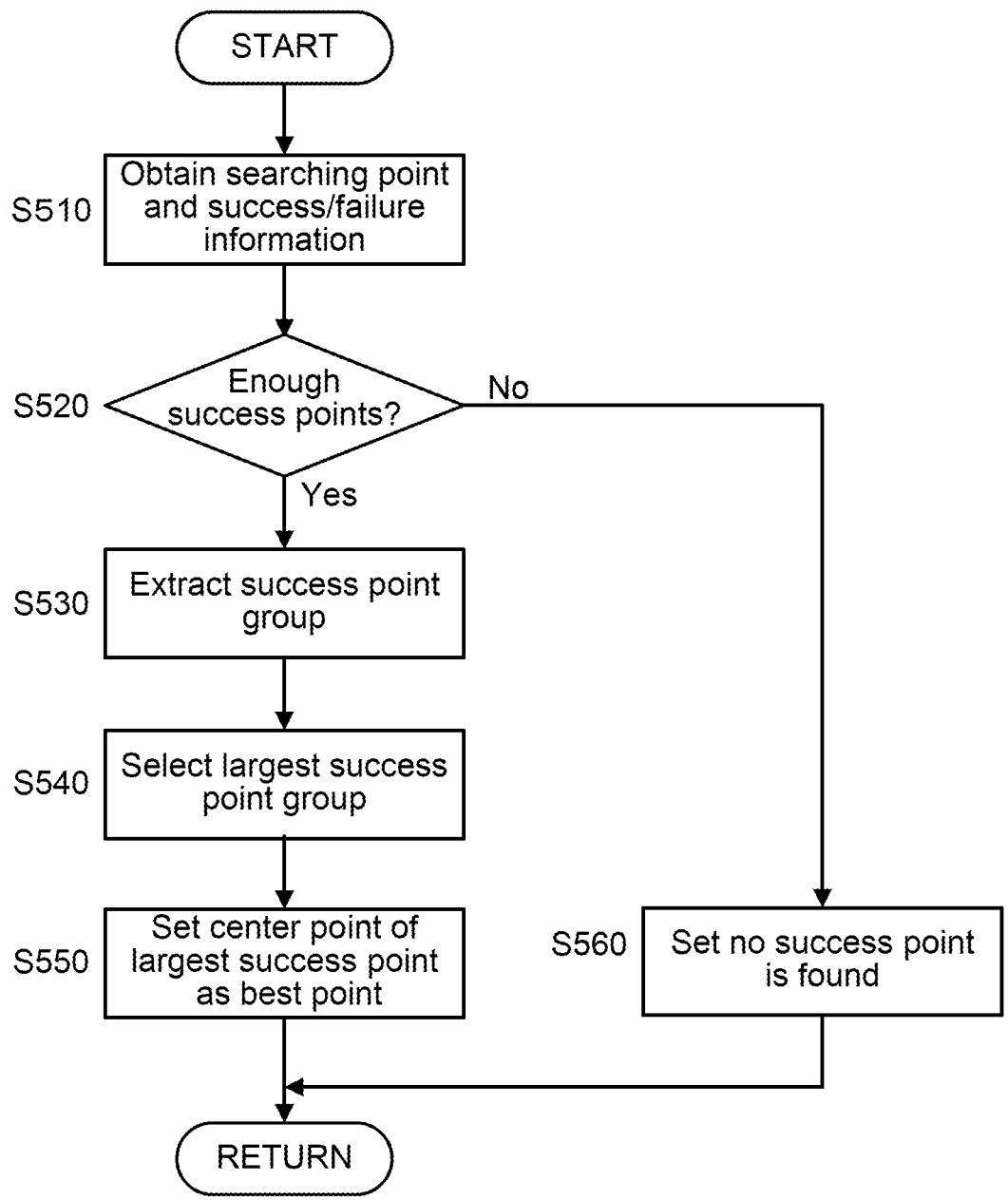
FIG. 17 is a flowchart of another embodiment of a best point determination process.

FIG. 17 is a flowchart of the best point determination process in another embodiment of the present invention. In FIG. 15 described above, the best point is determined by weighting the searching point having a region including the most success points on the two-dimensional plane of the print medium M.

In comparison, another embodiment illustrated in FIG. 17 extracts success point groups that acknowledge sets of success points as two-dimensional images, selects a success point group of the largest area among the success point groups, and makes a center point of the selected success point group serve as the best point.

Once the best point determination process starts in the flowchart of FIG. 17, first, in step S510, the search unit obtains all communication success/failure information of searching points stored in the current storage region, and arranges this on the two-dimensional plane.

Next, the search unit determines whether there are enough success points.

For example, in a case where a criteria for the success points set in advance is not met, for example in a case there is not one success point that are adjacent to each other, or if the amount of success points does not reach ten percent of the entire searching points, it is determined that there is not enough success points. In this case, the process moves on to step S560, and the search unit displays on the display unit 28 that the best point cannot be calculated by the current success/failure information of searching points, and ends the processes in the present flowchart.

In a case of determining that there is enough success points, the process moves on to step S530, and the search unit extracts the set of success points where success points exist adjacent to each other as a "success point group".

Next, the process moves on to step S540, and the search unit selects the largest success point group in a case where there is a plural number of extracted success point groups. The largest success point group is the success group with the largest number of success points that belong in the success point group, that is, the success point group with the largest area.

Next, the process moves on to step S550, and the search unit determines center coordinates of the selected largest success point group, more specifically, a center point (centroid) in a case where the success point group is acknowledges as a two-dimensional plane, as the best point. Even by such method, it becomes possible to determine the best point from the obtained set of success points.

Figure 18:
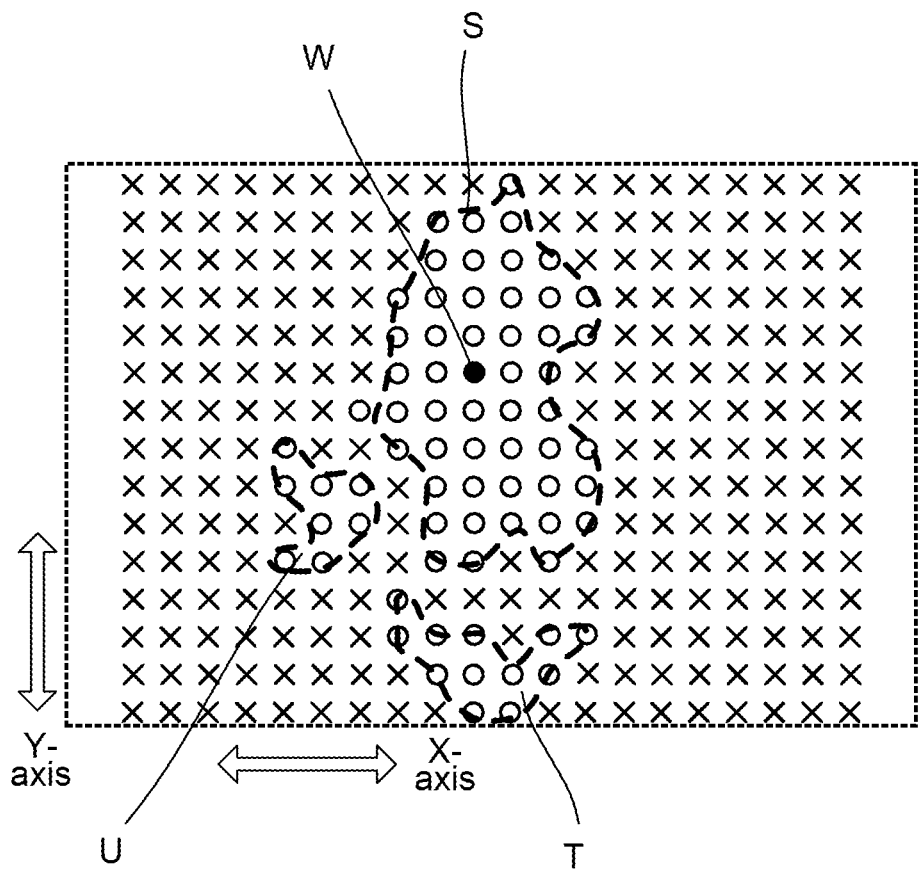
FIG. 18 is an explanatory diagram illustrating a success point group in another embodiment.

FIG. 18 is a view illustrating success point groups in another embodiment.

The example illustrated in FIG. 18 shows an example where three success point groups being a set of success points (success point group S, success point group T, success point group U) are extracted. The search unit selects, among these, the success point group S which is the success point group with the largest area. The search unit searches for the center coordinates of the success point group S, and determines the center point as the best point.

As described above, according to the present embodiment, a printer 1 is configured to print on a print medium M having an RFID inlet 110, which printer 1 includes a communication unit 50 configured to communicate with the RFID inlet 110, and a search unit configured to cause a position of the communication unit 50 with respect to the RFID inlet 110 to move to search for a position communicable with the RFID inlet 110, wherein the search unit determines communication success/failure between the RFID inlet 110 and the communication unit 50 at a plurality of positions with respect to the RFID inlet 110, and on the basis of a region including a plurality of positions determined as the communication being successful, identifying a communication position between the RFID inlet 110 and the communication unit 50.

According to this, the communication position with the communication unit 50 is identified on the basis of a region including a plurality of positions at which communication with the RFID inlet 110 is successful; hence, is possible to set the antenna 151 at a position at which the communication with the RFID inlet 110 of the print medium M at a printing starting position is optimum. Therefore, it is possible to efficiently identify an optimum communication position with the RFID inlet 110 in response to a type of the RFID inlet 110 embedded in the print medium M, individual difference of the printer 1 that prints on the print medium M, and the like.

The search unit sets a searching point occupying the most success points in its surrounding in a region including a plurality of positions being successful in communication with respect to the RFID inlet 110, as the communication position. According to this, it is possible to efficiently identify the optimum communication position with the RFID inlet 110 in response to a type of the RFID inlet 110 embedded in the print medium M, individual difference of the printer 1 that prints on the print medium M, and the like.

The search unit causes the antenna 151 of the communication unit 50 to move in a spiral or rectangular manner from the position set in advance, to search for a position communicable with the RFID inlet 110; hence, it is possible to efficiently identify an optimum communication position with the RFID inlet 110 in response to a type of the RFID inlet 110 embedded in the print medium M, individual difference of the printer 1 that prints on the print medium M, and the like.

The search unit increases the weighting, among the plurality of positions where the communication was successful, on positions with more positions determined as the communication being successful in adjacent positions, and identifies the communication position between the RFID inlet 110 and the communication unit 50 on the basis of this weighting; hence, it is possible to efficiently identify an optimum communication position with the RFID inlet 110 in response to a type of the RFID inlet 110 embedded in the print medium M, individual difference of the printer 1 that prints on the print medium M, and the like.

The search unit stores the identified communication position between the RFID inlet 110 and the communication unit 50 (information of best point) and sets the communication position of the communication unit 50 by using the stored communication position (information of best point included in past history information or tag model information). This thus allows for efficiently identifying the optimum communication position with the RFID inlet 110 even in a case where the print medium M is replaced with another type, for example.

The search unit extracts an area of a region that includes a plurality of positions at which the communication was successful, and identifies the communication position between the RFID inlet 110 and the communication unit 50 on the basis of the center coordinates of a region with the largest area. Accordingly, since the best point is set from a set of success points, it becomes possible to efficiently identify an optimum communication position with the RFID inlet 110.

While some embodiments of the present invention have been described, the above-described embodiments illustrate some examples to which the present invention is applicable and are not intended to limit the technical scope of the present invention to the specific configurations of the above-described embodiments.

The present application claims priority to Japanese Patent Application No. 2019-068596 filed on Mar. 29, 2019 to Japan Patent Office, the entire content of which is incorporated herein by reference.

The invention claimed is:

1. A printer configured to print on a printing medium having an RFID, the printer comprising:
   a communication unit configured to communicate with the RFID; and
   a search unit configured to move the communication unit to a position with respect to the RFID to search for a position at which the communication unit is communicable with the RFID,
   wherein the search unit:
      determines communication success/failure between the RFID and the communication unit at a plurality of positions with respect to the RFID, and on the basis of a region including a plurality of positions at which the search unit has determined that the communication was successful,
      weighs each of the plurality of positions based on a number of adjacent positions at which the communication has been determined to be successful to obtain a highest weighted position among the plurality of weighted positions,
      identifies a communication position between the RFID and the communication unit, based on the communication position having the highest weighted position, and
      causes the communication unit to move based on the communication position having the highest weighted position.

2. The printer according to claim 1, wherein the search unit causes the communication unit to move in a spiral or rectangular manner from a position determined in advance, to search for a position communicable with the RFID.

3. The printer according to claim 2, wherein the search unit stores the identified communication position between the RFID and the communication unit, and identifies the communication position with the communication unit on the basis of the stored communication position.

4. The printer according to claim 3, wherein the search unit extracts an area of the region including the plurality of positions at which the search unit has determined that the communication was successful and identifies the communication position between the RFID and the communication unit on the basis of a center of the region having the largest area.

5. The printer according to claim 2, wherein the search unit extracts an area of the region including the plurality of positions at which the search unit has determined that the communication was successful and identifies the communication position between the RFID and the communication unit on the basis of a center of the region having the largest area.

6. The printer according to claim 2, wherein the search unit identifies a center of the region including the plurality of positions at which the search unit has determined that the communication was successful as the communication position between the RFID and the communication unit.

7. The printer according to claim 6, wherein the search unit stores the identified communication position between the RFID and the communication unit, and identifies the communication position with the communication unit on the basis of the stored communication position.

8. The printer according to claim 7, wherein the search unit extracts an area of the region including the plurality of positions at which the search unit has determined that the communication was successful and identifies the communication position between the RFID and the communication unit on the basis of a center of the region having the largest area.

9. The printer according to claim 6, wherein the search unit extracts an area of the region including the plurality of positions at which the search unit has determined that the communication was successful and identifies the communication position between the RFID and the communication unit on the basis of a center of the region having the largest area.

10. The printer according to claim 1, wherein
the search unit stores the identified communication position between the RFID and the communication unit, and identifies the communication position with the communication unit on the basis of the stored communication position.

11. The printer according to claim 10, wherein
the search unit extracts an area of the region including the plurality of positions at which the search unit has determined that the communication was successful and identifies the communication position between the RFID and the communication unit on the basis of a center of the region having the largest area.

12. The printer according to claim 1, wherein
the search unit extracts an area of the region including the plurality of positions at which the search unit has determined that the communication was successful and identifies the communication position between the RFID and the communication unit on the basis of a center of the region having the largest area.

13. A control method of a printer configured to print on a printing medium having a RFID,
the printer comprising: a communication unit configured to communicate with the RFID; and a search unit configured to move the communication unit to a position with respect to the RFID to search for a position communicable with the RFID,
the method comprising:
determining communication success/failure between the RFID and the communication unit at a plurality of positions with respect to the RFID;
weighing each of the plurality of positions based on a number of adjacent positions at which the communication has been determined to be successful to obtain a highest weighted position among the plurality of weighted positions;
identifying a communication position between the RFID and the communication unit, based on the communication position having the highest weighted position; and
causing the communication unit to move the communication unit based on the communication position having the highest weighted position.

14. A non-transitory computer-readable medium storing a program executable by a computer of a printer configured to print on a printing medium having an RFID,
the printer comprising: a communication unit configured to communicate with the RFID; and a search unit configured to move the communication unit to a position with respect to the RFID to search for a position communicable with the RFID,
the program causing the computer to:
determine communication success/failure between the RFID and the communication unit at a plurality of positions with respect to the RFID;
weigh each of the plurality of positions based on a number of adjacent positions at which the communication has been determined to be successful to obtain a highest weighted position among the plurality of weighted positions;
identify a communication position between the RFID and the communication unit, based on the communication position having the highest weighted position; and
cause the communication unit to move based on the communication position having the highest weighted position.

* * * * *